(12) United States Patent
Ishikawa

(10) Patent No.: US 8,695,191 B2
(45) Date of Patent: Apr. 15, 2014

(54) METHOD AND DEVICE FOR ASSEMBLING SWASH PLATE-TYPE FLUID MACHINE

(75) Inventor: Tatsuya Ishikawa, Aichi (JP)

(73) Assignee: Sanyo Machine Works, Ltd., Aichi (JP)

( * ) Notice: Subject to any disclaimer, the term of this patent is extended or adjusted under 35 U.S.C. 154(b) by 0 days.

(21) Appl. No.: 13/462,673

(22) Filed: May 2, 2012

(65) Prior Publication Data

US 2012/0210577 A1 Aug. 23, 2012

Related U.S. Application Data

(62) Division of application No. 12/089,307, filed as application No. PCT/JP2005/018381 on Oct. 4, 2005, now Pat. No. 8,418,333.

(51) Int. Cl.
 *B25B 27/14* (2006.01)
(52) U.S. Cl.
 USPC ............................................. 29/281.5
(58) Field of Classification Search
 USPC ............ 29/888.02, 888, 888.021, 888.022, 29/888.04, 700, 771, 787, 822, 823, 281.1, 29/281.4, 281.5, 283
 See application file for complete search history.

(56) References Cited

U.S. PATENT DOCUMENTS

| | | | |
|---|---|---|---|
| 5,369,878 A | 12/1994 | Tsuji et al. | |
| 6,038,767 A | 3/2000 | Ito | |
| 2003/0217459 A1 | 11/2003 | Kim | |
| 2004/0159231 A1 | 8/2004 | Kim | |

FOREIGN PATENT DOCUMENTS

| | | |
|---|---|---|
| EP | 1 264 987 A1 | 12/2002 |
| JP | 58-082636 A | 5/1983 |
| JP | 5-321831 A | 12/1993 |
| JP | 8-219012 A | 8/1996 |
| JP | 10-045065 A | 2/1998 |
| JP | 2001-248550 A | 9/2001 |
| JP | 2003-343431 A | 12/2003 |
| JP | 2004-27913 A | 1/2004 |
| JP | 2004-239264 A | 8/2004 |
| JP | 2005-226654 A | 8/2005 |
| JP | 2007-518020 A | 7/2007 |
| WO | WO 01/66945 A1 | 9/2001 |
| WO | WO 2005/073557 A1 | 8/2005 |

OTHER PUBLICATIONS

Human Translation of Hirabayashi (JP58082636A); May 1983.*
Japanese Office Action from JP App. No. 2011-085552 dated on Mar. 30, 2012.
European Search Report dated Aug. 5, 2013.

* cited by examiner

*Primary Examiner* — David Bryant
*Assistant Examiner* — Ryan J Walters
(74) *Attorney, Agent, or Firm* — Arent Fox LLP

(57) ABSTRACT

An assembly device includes a shaft assembly having a plurality of pistons installed on an outer peripheral portion of a swash plate via shoes. The assembly device has a shaft support portion which supports a shaft having the swash plate in a vertical axis posture, a guide member, a shoe incorporation mechanism, a carriage which conveys the plurality of pistons in the vertical axis posture, and a piston holding portion which holds the plurality of pistons. The guide member is equipped with a first guide surface and a second guide surface.

2 Claims, 8 Drawing Sheets

METHOD AND DEVICE FOR ASSEMBLING SWASH PLATE-TYPE FLUID MACHINE

CROSS-REFERENCE TO RELATED APPLICATION

This is a Divisional Application of U.S. patent application Ser. No. 12/089,307, filed Jan. 26, 2009; which is a National Stage entry of International Application No. PCT/JP2005/018381, having an international filing date of Oct. 4, 2005. The disclosures of these prior applications are hereby incorporated herein its entirety by reference.

TECHNICAL FIELD

The present invention relates to a method and a device for assembling a swash plate-type fluid machine.

BACKGROUND ART

An assembly device disclosed in JP 10-45065 A (U.S. Pat. No. 6,038,767) is known as a device for automatically assembling a swash plate-type fluid machine, for example, a swash plate-type compressor. In this assembly device, pistons are sequentially incorporated with a swash plate of a swash plate-equipped shaft that is rotatably supported in a horizontal posture, to thereby assemble a shaft assembly. Each of the pistons is then supported by a cylinder disposed on both axial sides thereof, so the circumferential position of each of the pistons is held. In this state, the shaft assembly is incorporated into a cylinder block.

Patent Document 1: JP 10-45065 A

DISCLOSURE OF THE INVENTION

Problem to be Solved by the Invention

Incidentally, swash plate-type compressors are broadly classified as fixed swash plate-type compressors each having a swash plate whose angle of inclination is fixed with respect to a shaft, and variable swash plate-type compressors each having a swash plate whose angle of inclination is variable. In many cases, a piston used for a fixed swash plate-type compressor is a so-called double-headed piston having a neck portion in an axially central region thereof. Center holes for grinding finish are formed in both end surfaces of this piston respectively. On the other hand, in many cases, a piston used for a variable swash plate-type compressor is a so-called single-headed piston having a neck portion at a position axially biased toward one side thereof. In the single-headed piston, it is difficult, for structural reasons, to form center holes in both end surfaces thereof, respectively. As a rule, only one of the end surfaces (end surface of a head portion of the piston) often has a center hole formed therein.

In the assembly device disclosed in Patent Document described above, each of the pistons is supported by the cylinder from both axial sides thereof, with the aid of center holes in both end surfaces of the piston, so the center holes in both the end surfaces of the piston are indispensable. Accordingly, it is difficult to carry out assembly with this assembly device in the case where only one of the end surfaces of the piston has a center hole formed therein or neither of the end surfaces of the piston has a center hole formed therein. In this context as well, there is no alternative but to carry out assembly by hand in the cases of conventional variable swash plate-type fluid machines.

It is therefore an object of the present invention to provide an assembly device making it possible to automatically assemble a shaft assembly and also a swash plate-type fluid machine regardless of whether or not there is a center hole formed in each end surface of each piston.

According to the present invention, there is provided a device for assembling a shaft assembly having a plurality of pistons each installed on a swash plate via a pair of shoes matching with both end surfaces of the swash plate, respectively. The device for assembling a shaft assembly includes: a shaft support portion for supporting a shaft having the swash plate in a vertical axis posture; a guide member equipped with a first guide surface and a second guide surface, for guiding each of the pistons to the swash plate to match the pair of the shoes with both the end surfaces of the swash plate, respectively, while holding one of the shoes in slidable contact with the first guide surface and another shoe in slidable contact with the second guide surface; a shoe incorporation mechanism for inserting the pair of the shoes between each of the pistons and the first guide surface and between that piston and the second guide surface, respectively; conveyance means for conveying the plurality of pistons guided by the guide member in the vertical axis posture; and a piston holding portion for holding the plurality of pistons guided to the swash plate at circumferentially equidistant positions of the swash plate respectively in the vertical axis posture.

Further, in the present invention, when assembling a shaft assembly having a plurality of pistons each installed on a swash plate via a pair of shoes matching with both end surfaces of the swash plate, respectively, a shaft having the swash plate is supported in a vertical axis posture, the shoes are incorporated between a first guide surface of a guide member and each of the pistons and between a second guide surface of the guide member and that piston, respectively, the plurality of pistons are guided to the swash plate in the vertical axis posture using the guide member, and the shoes match with both the end surfaces of the swash plate respectively while the pistons are disposed at circumferentially equidistant positions of the swash plate, respectively.

As described above, in the present invention, the plurality of pistons remaining in the vertical axis posture are sequentially incorporated with the swash plate of the shaft supported in the vertical axis posture, via the guide member. In this case, each of the pistons holds the position thereof due to a frictional force generated by its own weight. Therefore, there is no need to support the piston from both the axial sides thereof with the aid of the center holes formed in both the end surfaces of the piston respectively as in conventional cases. Accordingly, the shaft assembly can be assembled regardless of whether or not there is a center hole formed in each of the end surfaces of each of the pistons. Also, the assembly device can be simplified owing to the omission of the cylinder. The vertical axis posture mentioned herein means that the central axis of a member in question is substantially vertical. In particular, the vertical axis posture of the shaft also covers a case where the central axis of the shaft is inclined within a range defined by a minimum angle θ1 of inclination of the swash plate.

The shoe incorporation mechanism is equipped with, for example, a groove portion provided in at least one of the guide surfaces, and an elastic member disposed in the groove portion and designed to be elastically deformable in such a direction as to increase a groove depth. Thus, each of the shoes supplied into the groove portion with the groove depth reduced can be inserted between a corresponding one of the guide surfaces and a corresponding one of the pistons while elastically deforming the elastic member. As a result, each of the shoes can be incorporated with a simple mechanism.

The shoe incorporation mechanism is equipped with a first incorporation portion for inserting one of the shoes between a corresponding one of the pistons and the first guide surface, and a second incorporation portion for inserting the other shoe between that piston and the second guide surface. In this case, the first incorporation portion and the second incorporation portion are disposed apart from each other in a direction in which the pistons are conveyed. A time difference can thereby be provided between a timing for incorporating one of the shoes and a timing for incorporating the other shoe. By utilizing this time difference, so-called matching, namely, the operation of selecting and using that one of the shoes which has an optimal surface accuracy in accordance with, for example, the machining accuracy of each of the pistons or the swash plate can be carried out. In consequence, high assembly accuracy can be obtained stably.

According to the present invention, there is provided a device for assembling a swash plate-type fluid machine for incorporating a shaft assembly, which has a plurality of pistons each installed on a swash plate via a pair of shoes matching with both end surfaces thereof, respectively, into a cylinder block. The device for assembling a swash plate-type fluid machine includes: an assembly support portion for supporting the shaft assembly in a vertical axis posture with the respective pistons suspended by the swash plate; and a cylinder block support portion for supporting the cylinder block, in which the assembly support portion and the cylinder block support portion approach each other to insert the pistons of the shaft assembly into a corresponding one of cylinder bores of the cylinder block.

Further, in the present invention, when assembling a swash plate-type fluid machine, with each of a plurality of pistons suspended by a swash plate, a shaft assembly in a vertical axis posture and a cylinder block are brought close to each other to insert each of the pistons into a corresponding one of cylinder bores, in incorporating the shaft assembly, which has the plurality of pistons each installed on the swash plate via a pair of shoes matching with both end surfaces of the swash plate, respectively, into the cylinder block.

In assembling the fluid machine, each of the pistons is suspended by the swash plate and is in an unstable state, namely, tends to be displaced with respect to the swash plate. However, owing to a frictional force generated by the weight of each of the pistons, a moderate binding force acts between each of corresponding ones of the shoes and the swash plate, so the piston does not slide on an end surface of the swash plate even when some impact extends to the piston. Accordingly, there is no need to bind each of the pistons from both the sides thereof using the cylinder or the like during the assembly of the fluid machine as in the cases of conventional devices. Thus, the swash plate-type fluid machine can be assembled regardless of whether or not there is a center hole formed in each of the end surfaces of each of the pistons. Owing to the possibility of omitting the cylinder, the assembly device can be simplified in structure correspondingly.

It is desirable to provide this assembly device with a correction surface that is movable in a reciprocating manner into and out of an opening portion of the cylinder bore of the cylinder block and stands by outside the opening portion. In this case, the correction surface is brought into surface contact with the end surface of each of the pistons of the shaft assembly, which is supported by the assembly support portion, to correct the posture of the piston.

Each of the pistons suspended by the swash plate is rockable with respect to the swash plate, and hence may be slightly inclined with respect to the vertical axis when being inserted into the cylinder bore. In this state, the end surface of the piston interferes with the opening portion of the cylinder bore, so it is difficult to insert the piston smoothly. However, if the end surface of the piston is brought into surface contact with the correction surface in advance to correct the posture of the piston, the piston is accurately corrected into the vertical axis posture and then inserted into the cylinder bore. Accordingly, the piston can be inserted into the cylinder bore smoothly. The correction surface retreats into the cylinder bore as the piston is inserted into the cylinder bore, so the piston can be inserted into the cylinder bore reliably.

If the piston inserted into the cylinder bore is guided by a tapered surface provided along the opening portion of the cylinder bore, center alignment of the piston and the cylinder bore is carried out reliably. Therefore, the piston can be inserted into the cylinder bore more smoothly.

Effect of the Invention

According to the present invention, the shaft assembly and also the swash plate-type fluid machine employing the shaft assembly can be assembled regardless of whether or not there is a center hole formed in each of the end surfaces of each of the pistons. Further, the device for assembling those components can be simplified in construction.

Figure 1:
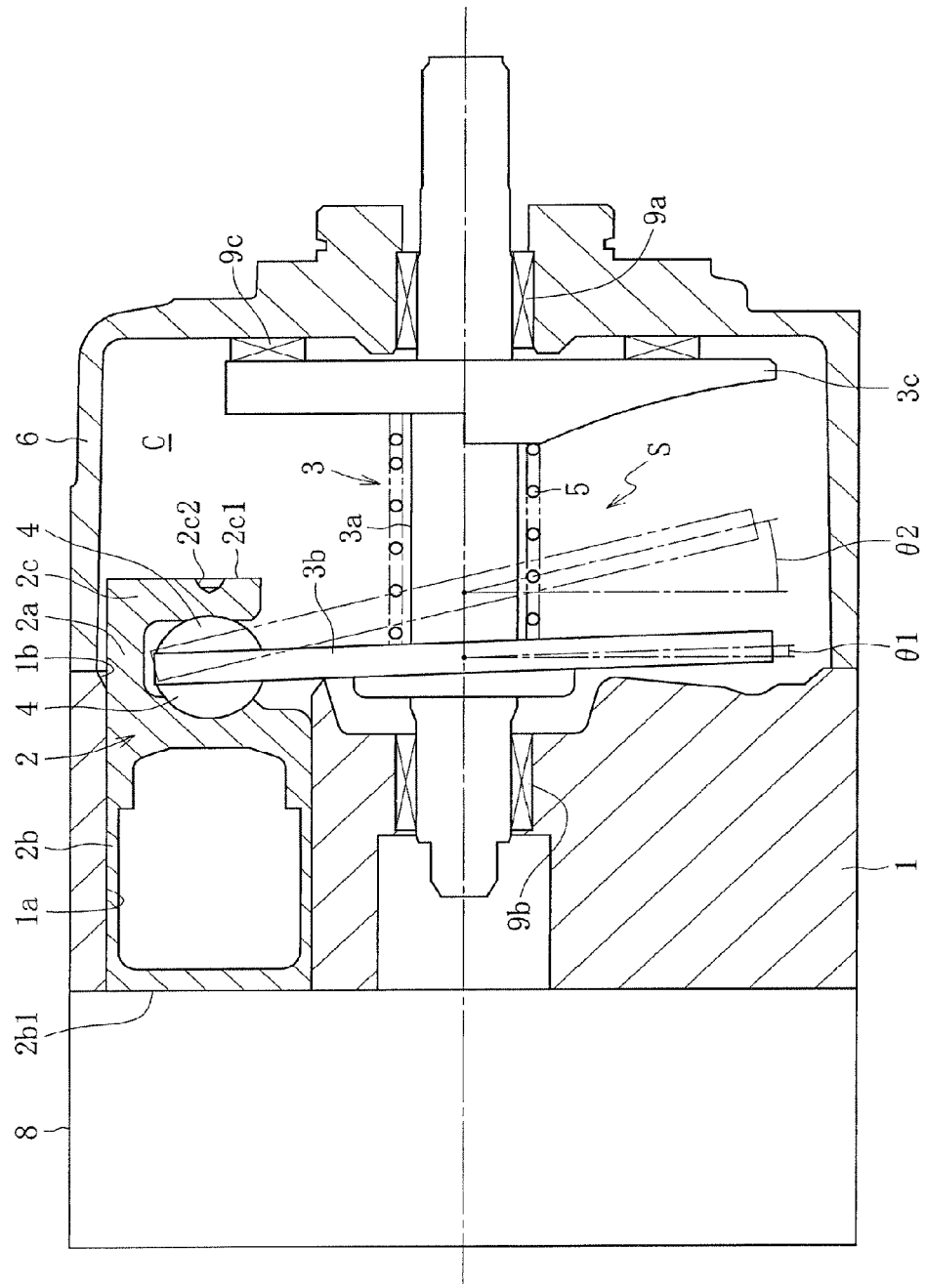
FIG. 1 is a sectional view showing the schematic structure of a swash plate-type compressor.

DESCRIPTION OF REFERENCE SYMBOLS 1 cylinder block
1a cylinder bore
1b tapered surface
2 piston
2a neck portion
2b trunk portion
2b1 end surface
2c head portion
2c1 end surface
2c2 center hole
3 shaft
3a shaft portion
3b swash plate
3c flange portion
4 shoe
5 elastic member (spring)
6 front housing
8 rear housing
10 conveyance means (carriage)

11 rail
12 receiving member
12a receiving portion
14 rack
20 guide member
22 first guide surface
23 second guide surface
30 shoe incorporation mechanism
31 first incorporation portion
32 second incorporation portion
34 groove portion
35 elastic member (leaf spring)
40 piston mounting mechanism
41 shaft support portion
41a piston holding portion
42 outer peripheral guide
43 bearing portion
44 frame
46 gear
50 assembly conveyance mechanism
51 shaft guide
52 assembly support portion
53 piston guide
60 cylinder block support portion
70 piston posture correction mechanism
71 correction member
71c correction surface
72 elastic member (spring)

BEST MODE FOR CARRYING OUT THE INVENTION

An embodiment of the present invention will be described hereinafter on the basis of FIGS. 1 to 8.

FIG. 1 shows the schematic structure of a swash plate-type compressor as an example of a swash plate-type fluid machine.

This swash plate-type compressor mainly includes a cylinder block 1, pistons 2, a shaft 3 having a swash plate 3b, and shoes 4 each interposed between the swash plate 3b and a corresponding one of the pistons 2. A space on a front side (crank chamber C) of the cylinder block 1 is sealed up by a front housing 6, and a space on a rear side of the cylinder block 1 is sealed up by a rear housing 8. The shaft 3 is supported rotatably with respect to the front housing 6 and the cylinder block 1 by two radial bearings 9a and 9b, which are disposed in an axial direction of the shaft 3, and a thrust bearing 9c.

A plurality of cylinder bores 1a are formed in the cylinder block 1 at circumferentially equidistant positions thereof respectively, and each of the pistons 2 is slidably inserted in a corresponding one of the cylinder bores 1a. A fluid (e.g., cooling medium) sucked from a suction chamber (not shown) is compressed and discharged to a discharge chamber (not shown) through reciprocating movements of the pistons 2. The fluid is compressed when each of the pistons 2 is at a position shown in FIG. 1. This position is referred to as top dead center.

The shaft 3 includes a shaft portion 3a, the swash plate 3b, and a flange portion 3c. The swash plate 3b assumes the shape of a disc. The shaft portion 3a and the flange portion 3c are integrally formed, and the swash plate 3b is tiltably installed on the shaft portion 3a via a bearing (not shown) or the like. The swash plate 3b is coupled to the flange portion 3c via an appropriate link mechanism (not shown), and a relationship between the angle of inclination of the swash plate 3b (angle formed between the swash plate 3b and a plane perpendicular to an axis of the shaft 3) and the axial position of the swash plate 3b is uniquely determined through actuation of the link mechanism. The swash plate 3b can assume an arbitrary angle of inclination between a minimum angle θ1 of inclination (indicated by a solid line) and a maximum angle θ2 of inclination (indicated by alternate long and two short dashes lines). No matter what angle of inclination the swash plate 3b assumes, the axial position of each of the pistons 2 at the top dead center is substantially unchanged. An elastic member, for example, a coil spring 5 is disposed in a compressed state between the swash plate 3b and the flange portion 3c. When no other external force is applied to the swash plate 3b, the swash plate 3b keeps assuming the minimum angle θ1 of inclination due to an elastic force of the spring 5.

Each of the pistons 2, which is designed as a so-called single-headed piston, is integrally formed of a neck portion 2a, a hollow cylindrical trunk portion 2b formed on one axial side of the neck portion 2a, and a solid head portion 2c formed on the other axial side of the neck portion 2a. A center hole 2c2 used for the grinding of the piston 2 or the like is formed in an end surface 2c1 of the head portion 2c. On the other hand, the trunk portion 2b has a flat end surface 2b1 with no center hole formed therein.

A peripheral edge portion of the swash plate 3b is inserted in a recess forming the neck portion 2a. The shoes 4 are interposed respectively between one of both end surfaces of the swash plate 3b and the trunk portion 2b opposed thereto, and between the other end surface and the head portion 2c opposed thereto. Spherical surfaces of the shoes 4 are spherically fitted on spherical seats formed in the trunk portion 2b and the head portion 2c respectively, and flat surfaces of the shoes 4 are in surface contact with both the end surfaces of the swash plate 3b respectively.

When the shaft portion 3a of the shaft 3 is rotationally driven, the swash plate 3b also rotates together with the shaft portion 3a. As a result, each of the pistons 2 guided by the swash plate 3b axially moves in a reciprocating manner within a corresponding one of the cylinder bores 1a, so the cooling medium is repeatedly sucked and compressed, and then discharged to the discharge chamber. When the pressure in the crank chamber C is changed by a control valve (not shown), the stroke of the piston 2 and also the angle of inclination of the swash plate 3b change due to a difference in pressure between the pressure of the cooling medium sucked into the cylinder bore 1a via the piston 2 and the pressure in the crank chamber C, so the discharge amount of the cooling medium fluctuates. Accordingly, the control of a compression capacity can be performed arbitrarily by controlling the pressure in the crank chamber C using the control valve. The compression capacity is expressed by the angle of inclination of the swash plate 3b. The compression capacity is minimized when the swash plate 3b assumes the minimum angle θ1 of inclination, and maximized when the swash plate 3b assumes the maximum angle θ2 of inclination.

Processes of assembling the aforementioned variable-capacity swash plate-type compressor will be described hereinafter.

This swash plate-type compressor is assembled through a first process of fabricating a shaft assembly S, and a second process of incorporating the shaft assembly S into the cylinder block 1.

In the first process, the shaft assembly S is automatically assembled by an assembly device A1 shown in FIGS. 2 to 5.

Figure 2:
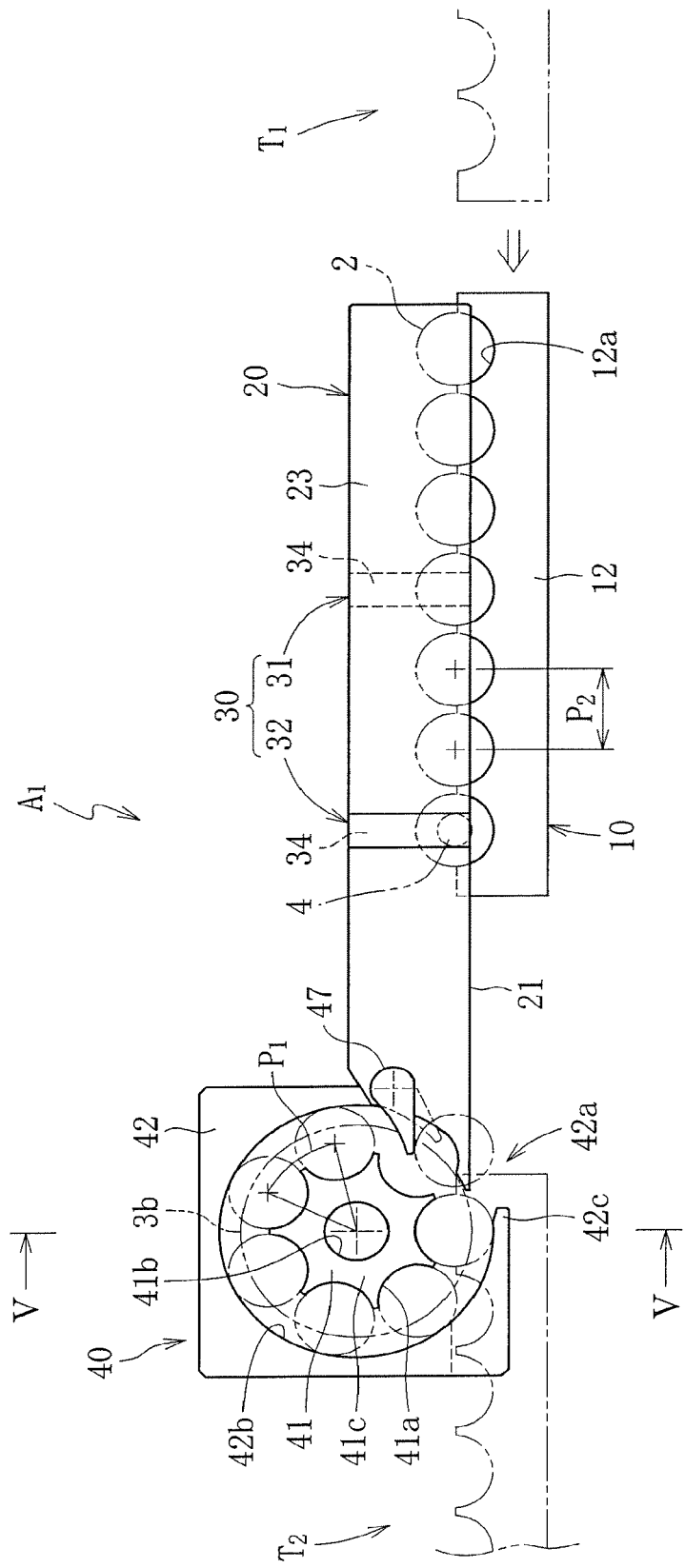
FIG. 2 is a plan view showing the schematic construction of a device for assembling a shaft assembly.
Figure 3:
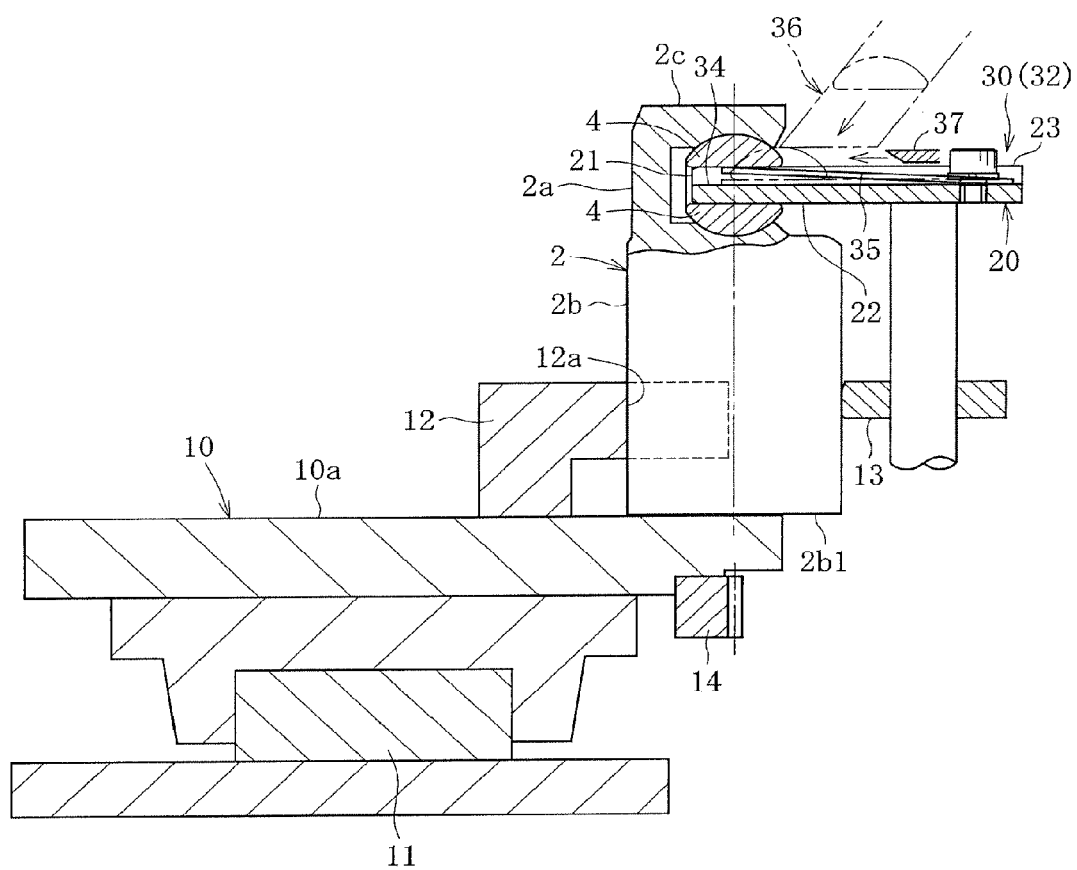
FIG. 3 is a sectional view showing the schematic construction of a shoe incorporation mechanism.

As shown in FIGS. 2 and 3, this assembly device A1 includes a carriage 10 running horizontally as conveyance means, a guide member 20 disposed parallel to the running direction of the carriage 10, a shoe incorporation mechanism 30 for incorporating each of the shoes 4 between a corresponding one of the pistons 2 and the guide member 20, and a piston mounting mechanism 40 for mounting each of the pistons 2 on the swash plate 3b together with corresponding ones of the shoes 4.

The carriage 10, which is guided by a rail 11, can horizontally move in a reciprocating manner between two regions T1 and T2 while sandwiching the guide member 20. A receiving member 12 is fitted on a top surface 10a of the carriage 10. Receiving portions 12a for holding a set of (seven in this embodiment of the present invention) the pistons 2 are formed in the receiving member 12. The number of the receiving portions 12a is equal to the number of the pistons 2. Each of the receiving portions 12a assumes the shape of a semi-cylindrical surface conforming to an outer peripheral surface of the trunk portion 2b of a corresponding one of the pistons 2. The receiving portions 12a are formed at a constant pitch P2 in the running direction of the carriage 10 (see FIG. 2). A holddown member 13 is disposed in a region opposed to each of the receiving portions 12a across the trunk portion 2b of a corresponding one of the pistons 2. This holddown member 13 is formed extending to the piston mounting mechanism 40 along the running direction of the carriage 10. The carriage 10 is mounted with a rack 14 along the running direction thereof. As will be described later, this rack 14 extends to a position for meshing with a gear 46 (see FIG. 5) fixed to a rotary shaft 45 of a shaft support portion 41. In FIG. 2, for the sake of simplification, only the receiving member 12 of the carriage 10 is illustrated, and the holddown member 13, the rack 14, and the like are not illustrated.

As shown in FIG. 2, in the region T1 adjacent to a leading end of the guide member 20, one set of the pistons 2, whose central axes extend vertically, are supplied onto the carriage 10. At this moment, the end surface 2b1 of the trunk portion 2b of each of the pistons 2 is in contact with the top surface 10a of the carriage 10 in a supporting manner, and the outer peripheral surface of the trunk portion 2b is bound from both the sides thereof by a corresponding one of the receiving portions 12a and the holddown member 13. After that, the carriage 10 is caused to start running to the left in FIG. 2 by a drive mechanism (not shown). A known mechanism such as a ball screw, a cylinder, or the like can be employed as the drive mechanism for the carriage 10. Alternatively, a self-propelled carriage with a built-in motor or the like can be employed as well.

The guide member 20 is formed in the shape of a board having the same wall thickness as that of the swash plate 3b. When the carriage 10 reaches an area beside the guide member 20 after having been supplied with the pistons 2, as shown in FIG. 3, a lateral end 21 of the guide member 20 is inserted into the recess formed by the piston neck portion 2a. At the same time, a lower end surface 22 (first guide surface) of the guide member 20 is opposed to the trunk portion 2b of each of the pistons 2 via a gap, and an upper surface (second guide surface 23) of the guide member 20 is opposed to the head portion 2c of each of the pistons 2 via a gap. In this state, the pistons 2 on the carriage 10 are sequentially supplied to the shoe incorporation mechanism 30.

The shoe incorporation mechanism 30 inserts one of the shoes 4 into the gap between the trunk portion 2b of a corresponding one of the pistons 2 and the first guide surface 22, and the other shoe 4 into the gap between the head portion 2c of that piston 2 and the second guide surface 23. In the case exemplified in this embodiment of the present invention, the operation of inserting a pair of the shoes 4 is independently performed by a first incorporation portion 31 and a second incorporation portion 32, which are disposed apart from each other in the running direction of the carriage 10.

As shown in FIG. 3, a groove portion 34 is formed in the second incorporation portion 32 by notching the second guide surface 23. An elastic member, for example, a leaf spring 35 is mounted on a groove bottom surface of the groove portion 34. The leaf spring 35 has a tip as a free end, and is elastically deformable in such a direction as to increase/reduce the depth of the groove portion 34. The depth of the groove portion 34 is set such that the gap between the leaf spring 35 and the entrance of the recess formed by the neck portion 2a of each of the pistons 2 becomes equal to or larger than the maximum wall thickness of each of corresponding ones of the shoes 4 when the leaf spring 35 is elastically deformed to be brought into close contact with the groove bottom surface. The width of the groove portion 34 is larger than the diameter of each of the shoes 4.

A shoe supply portion 36 extending from a supply device such as a parts feeder or the like is disposed in the vicinity of the entrance of the recess formed by the neck portion 2b of each of the pistons 2. After the carriage 10 stops, each of the shoes 4 supplied from the shoe supply portion 36 is disposed on the tip of the leaf spring 35, which is separated from the groove bottom surface of the groove portion 34. After that, when the shoe 4 is horizontally pressed against an elastic force of the leaf spring 35 using an appropriate pusher 37, the leaf spring 35 is elastically deformed to be brought into close contact with the groove bottom surface of the groove portion 34, so the shoe 4 is pressed into the recess. The leaf spring 35 is elastically restored as soon as the shoe 4 is pressed into the recess. Then, the spherical surface of the shoe 4 is spherically fitted onto the spherical seat of the head portion 2c, and the flat surface of the shoe 4 is pushed up to the same level as the second guide surface 23 of the guide member 20. The flat surface of the shoe 4 transfers onto the second guide surface 23 as the carriage 10 runs subsequently. Therefore, after that, the shoe 4 slides on the second guide surface 23 as the carriage 10 runs.

The first incorporation portion 31 has a construction conforming to that of the second incorporation portion 32 except that the groove portion 34 is formed in the first guide surface 22 and that the operation of inserting the shoes 4 is performed on the backside of the second incorporation portion 32.

In this embodiment of the present invention, the first incorporation portion 31 for incorporating one of the shoes 4 and the second incorporation portion 32 for incorporating the other shoe 4 are spaced apart from each other in the running direction of the carriage 10, so there is a time difference between the timings for incorporating both the shoes 4. By adopting this construction, so-called matching, namely, the operation of selecting and using that one of the shoes 4 which has a surface accuracy conforming to the machining accuracy of each of the swash plate 3b and the pistons 2 can be carried out. This matching can be carried out by the following procedure, for example.

(1) After the shoes 4 are fabricated, the dimensions thereof, for example, the maximum wall thicknesses thereof are measured. The shoes 4 are classified according to accuracy as groups in accordance with the measured values, and the shoes 4 are stored according to the respective groups. The wall thickness of the swash plate 3b of the shaft 3, which is to be assembled, is measured in advance.

Figure 4:
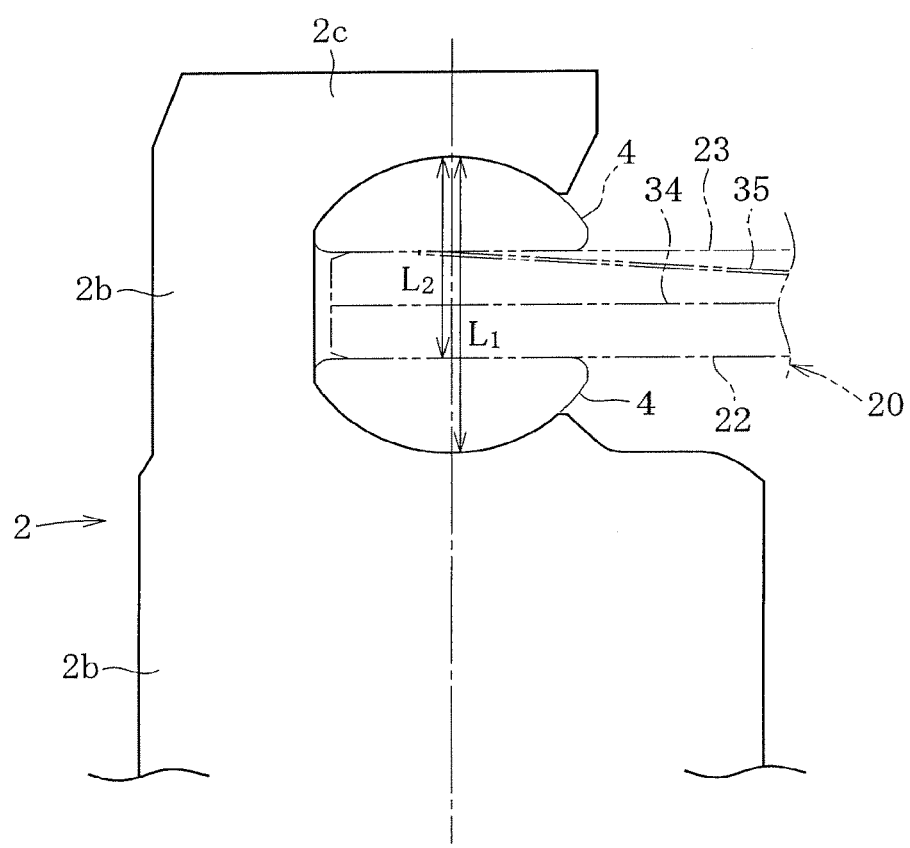
FIG. 4 is a sectional view showing an essential part of FIG. 3 on an enlarged scale.

(2) As shown in FIG. 4, before both the shoes 4 are incorporated, a distance L1 between the opposed spherical seats of each of the pistons 2 is measured. One of the shoes 4 is taken out from that one of the groups whose accuracy conforms to the measured value, supplied to the first incorporation portion 31, and incorporated.

(3) Then, a distance L2 between the flat surface of the incorporated shoe 4 and the spherical seat opposed thereto is measured, a measured value of the wall thickness of the swash plate 3b is subtracted from the measured value of the distance L2, and the other shoe 4 is taken out from that one of the groups whose accuracy conforms to the value calculated through subtraction, and is incorporated by the second incorporation portion 32.

By the foregoing procedure, those shoes 4 which conform to the machining accuracy of the swash plate 3b and each of the pistons 2 can be selected and used, so the operational stability and reliability of the swash plate-type compressor can be enhanced through an improvement in assembly accuracy. In the case where the above-mentioned matching operation is not required in particular, a pair of the shoes 4 may be simultaneously inserted into the gaps between the guide surfaces 22 and 23 and each of the pistons 2, respectively, without any time difference.

After the shoes 4 are thus incorporated between the guide surfaces 22 and 23 and each of the pistons 2, respectively, the pistons 2 on the carriage 10 are transferred to the piston mounting mechanism 40 and mounted to the swash plate 3b.

As shown in FIG. 2, the piston mounting mechanism 40 includes the shaft support portion 41 for supporting the shaft 3, and an outer peripheral guide 42 disposed on an outer peripheral side thereof.

Figure 5:
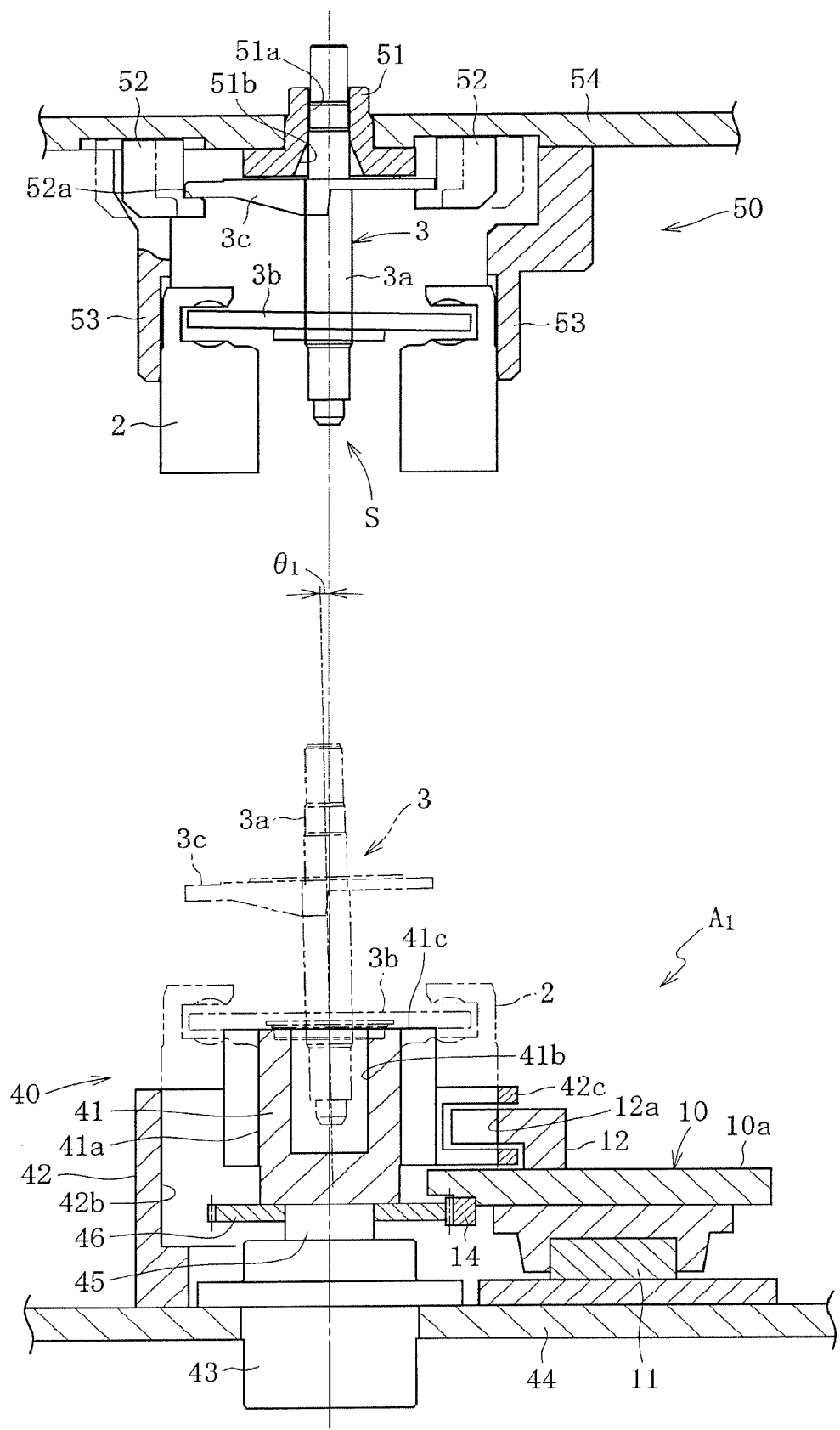
FIG. 5 is a sectional view taken along the line V-V of FIG. 2.

As shown in FIG. 5, the shaft support portion 41 supports the shaft 3 (indicated by alternate long and two short dashes lines) in a vertical axis posture with respect to the swash plate 3b. The shaft 3 is carried in with the swash plate 3b fitted thereon, namely, with the spring 5 inserted between the swash plate 3b and the flange portion 3c and with the swash plate 3b and the flange portion 3c coupled to each other by the link mechanism. The shaft 3 is supported, with a rear side thereof facing below, by the shaft support portion 41. In an assembly process, no external force exceeding the elastic force of the spring 5 is applied to the swash plate 3b of the shaft 3, so the swash plate 3b thereafter constantly assumes the minimum angle $\theta 1$ of inclination with respect to the shaft portion 3a. The shoes 4 are not illustrated in FIG. 5 (in FIG. 7 either). FIG. 5 shows the V-V section (see FIG. 2) at the time when the carriage 10 reaches an area beside the piston mounting mechanism 40.

The shaft support portion 41 has the shape of a bottomed tube. Semi-cylindrical piston holding portions 41a each conforming to the outer peripheral surface of the trunk portion 2b of a corresponding one of the pistons 2 are formed on an outer periphery of the shaft support portion 41 equidistantly in a circumferential direction. The number of the piston holding portions 41a is equal to the number of the pistons 2. In a state where the pistons 2 are held by the holding portions 41a respectively, a pitch P1 between adjacent ones of the pistons 2 on a circle passing through centers of the pistons 2 (length of a circular arc) is equal to the pitch P2 of the pistons 2 held by the receiving member 12 on the carriage 10 (see FIG. 2). An axial hole portion 41b is formed along an inner periphery of the shaft support portion 41. The shaft portion 3a of the shaft 3, which is located on the rear side with respect to the swash plate 3b of the shaft 3, is accommodated in the hole portion 41b. An upper end surface 41c of the shaft support portion 41 is a horizontal surface. The rear-side end surface of the swash plate 3b of the shaft 3 is laid on the upper end surface 41c in a surface contact state. In this state, although the central axis of the shaft portion 3a is inclined from the vertical direction by the minimum angle $\theta 1$ of inclination, the shaft 3 substantially assumes the vertical axis posture.

The shaft support portion 41 is supported by a bearing portion 43 rotatably with respect to a frame 44. The gear 46, which meshes with the rack 14 provided on the carriage 10, is fixed to the rotary shaft 45 of the shaft support portion 41. Accordingly, when the carriage 10 is caused to run horizontally, the shaft support portion 41 and also the shaft 3 supported by the shaft support portion 41 rotate in synchronization with the running of the carriage 10, due to the meshing between the rack 14 and the gear 46.

The outer peripheral guide 42 has the shape of a square tube with a cylindrical inner periphery. Part of a lateral wall of the outer peripheral guide 42 is cut open. The outer peripheral guide 42 is fixed to the frame 44. A terminal end of the guide member 20 is connected to an opening portion 42a of the outer peripheral guide 42. Part of an end surface at that terminal end is formed in the shape of a cylindrical surface continuous with an inner peripheral surface 42b of the outer peripheral guide 42. The rest of the end surface at the terminal end of the guide member 20 extends to a region close to an outer peripheral portion of the swash plate 3b supported by the shaft support portion 41, and the first guide surface 22 and the second guide surface 23 are continuous with both the end surfaces of the swash plate 3b in a stepless manner, respectively. One end 42c of the outer peripheral guide 42 that faces the opening portion 42a has a fork structure formed of an upper portion and a lower portion, between which the receiving member 12 of the carriage 10 can pass. A cylindrical surface formed by the inner peripheral surface 42b of the outer peripheral guide 42 and the end surface of the guide member 20 is circumscribed about an outer peripheral surface of each of the pistons 2 held by the shaft support portion 41, so each of the pistons 2 held by a corresponding one of the holding portions 41a is prevented from dropping.

When the carriage 10 reaches the area beside the piston mounting mechanism 40 after having passed the shoe incorporation mechanism 30, the pistons 2 held by the receiving member 12 are sequentially accommodated into gaps between the piston holding portions 41a of the shaft support portion 41 and the inner peripheral surface 42b of the outer peripheral guide 42 or the end surface of the guide member 20, respectively, via the opening portion 42a of the outer peripheral guide 42. (FIG. 2 shows a state where the six pistons 2 are accommodated in the gaps, respectively.) As a result, the pistons 2 transfer from the carriage 10 onto the swash plate 3b, and the shoes 4 disposed on the neck portion 2b of each of the pistons 2 match with both the end surfaces of the swash plate 3b, respectively. As described above, the pitch P1 of the piston holding portions 41a coincides with the pitch P2 of the receiving portions 12a, and the piston support portion 41 rotates in synchronization with horizontal movements of the carriage 10. Therefore, as the carriage 10 moves horizontally, the pistons 2 on the carriage 10 transfer onto the swash plate 3b one after another to be held by the piston holding portions 41a at circumferentially equidistant positions, respectively.

The swash plate 3b rotates together with the piston holding portions 41a when the shoes 4 transfer from the guide member 20 onto the swash plate 3b. Therefore, the shoes 4 can be smoothly transferred onto the swash plate 3b with the frictional force acting between each of the shoes 4 and the swash plate 3b reduced. If there is no problem in particular, the shaft 3 may be bound in a non-rotational manner while rotating the piston holding portions 41a.

When each of the pistons 2 supported by the carriage 10 is supplied to the piston mounting mechanism 40 while being spaced slightly apart from a corresponding one of the receiving portions 12a, smooth transfer of the piston 2 from the receiving portion 12a to a corresponding one of the piston holding portions 41a may not be ensured. In order to eliminate this situation, it is desirable to dispose a pressing member 47 at the terminal end of the guide member 20 as shown in FIG. 2. This pressing member 47 is rockable around a vertical axis between a position indicated by a solid line and a position indicated by alternate long and two short dashes lines, and urges the piston 2 toward the receiving portion 12a (in direction toward the position indicated by the alternate long and two short dashes lines) due to an elastic force of an elastic member (not shown). As the carriage 10 runs, the piston 2 comes into abutment on the pressing member 47. Then, the piston 2 is wedged in, and the outer peripheral surface thereof is brought into close contact with the receiving portion 12a. Therefore, the piston 2 can be conveyed more smoothly to the piston holding portion 41a.

Owing to the foregoing processes, the pistons 2 are mounted to the swash plate 3b of the shaft 3 equidistantly in a circumferential direction, so the assembly of the shaft assembly S is completed. The assembled shaft assembly S is carried upward out of the assembly device A1 by an assembly conveyance mechanism 50.

Figure 6:
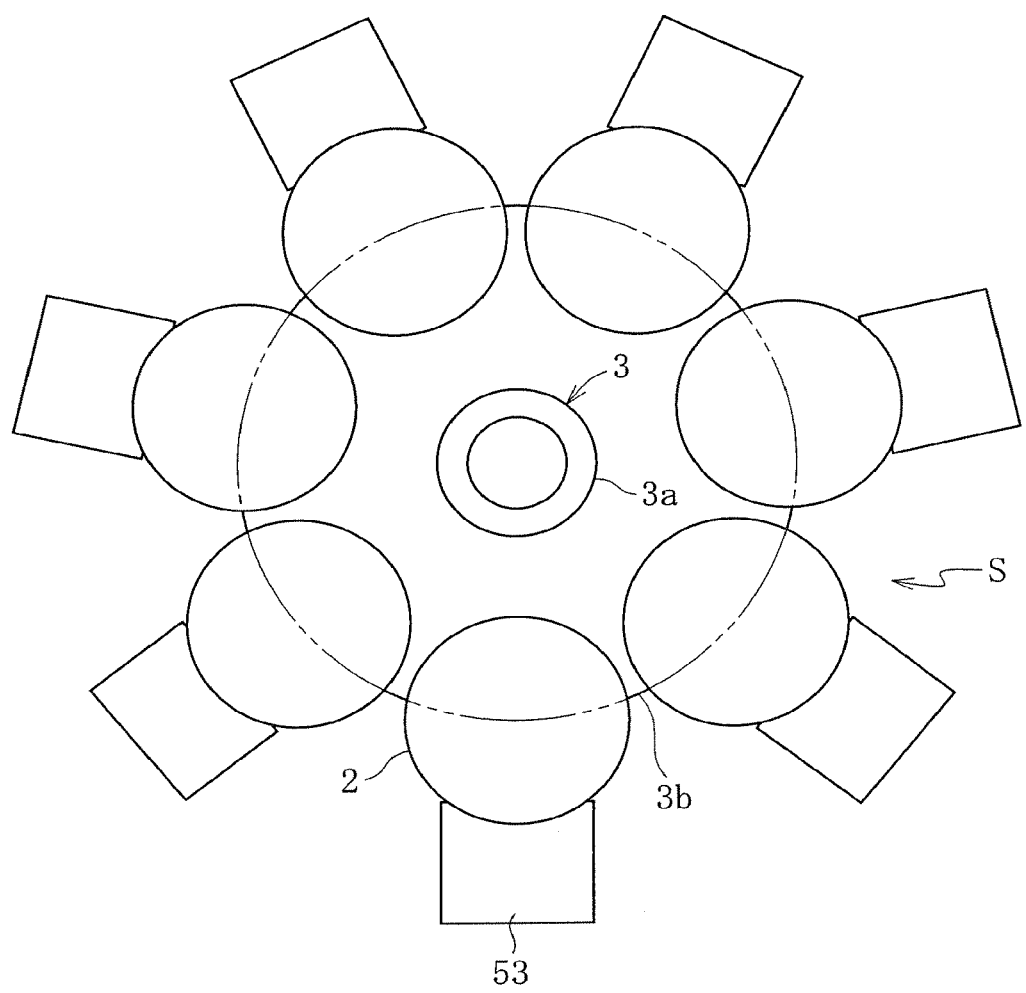
FIG. 6 is a plan view showing the schematic construction of an assembly transfer mechanism.
Figure 7:
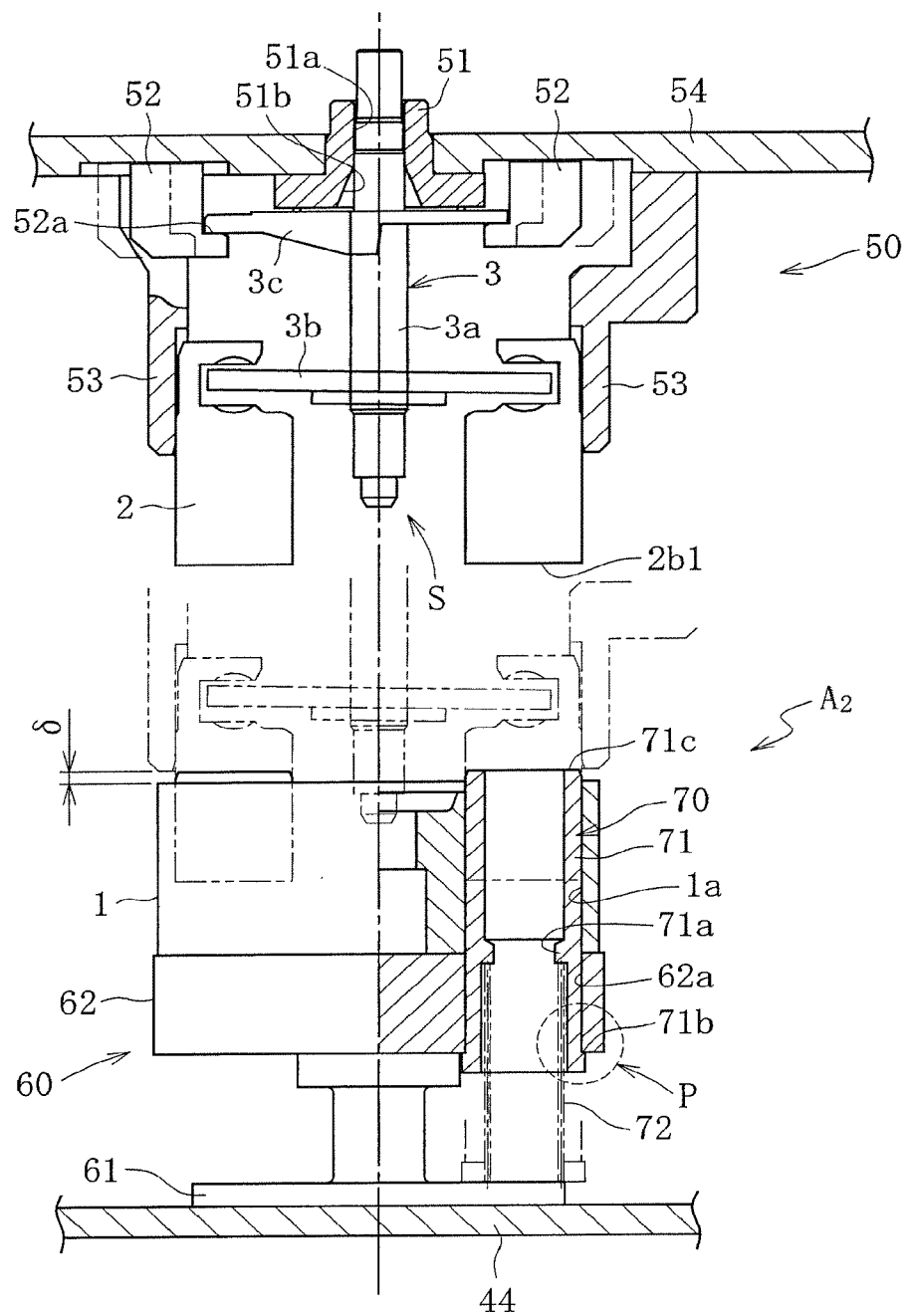
FIG. 7 is a sectional view showing a device for assembling the swash plate-type compressor.

The assembly conveyance mechanism 50, which is disposed above the assembly device A1 for the shaft assembly S, can be raised/lowered by being driven by a drive source such as a cylinder. This conveyance mechanism 50 includes a shaft guide 51, an assembly support portion 52, piston guides 53, and a base member 54 for installing those components. An insertion hole 51a for the shaft portion 3a of the shaft 3 to be inserted thereinto is formed along an inner periphery of the shaft guide 51, and a tapered surface 51b defining a diameter that decreases in an upward direction is formed below the insertion hole 51a. The assembly support portion 52 is radially movable with respect to the base member 54, and an engagement portion 52a for engaging a rear-side end surface of the flange portion 3c of the shaft 3 is formed at an inner radial end of the assembly support portion 52. As shown in FIG. 6, each of the piston guides 53 is disposed on a radially outer side of a corresponding one of the pistons 2 mounted to the swash plate 3b to bind the piston 2 from the radially outer side thereof, thereby preventing the piston 2 from dropping.

When the assembly of the shaft assembly S is completed, the assembly conveyance mechanism 50 is lowered, so a front-side tip of the shaft portion 3a is inserted into the shaft guide 51. Although the shaft 3 is inclined at the minimum angle θ1 of inclination on the shaft support portion 41 as described above, the front-side tip of the shaft portion 3a is smoothly guided to the insertion hole 51a by the tapered surface 51b of the shaft guide 51. Then, the assembly support portion 52 is moved to a radially inner side to engage the engagement portion 52a with the outer peripheral portion of the rear-side end surface of the flange portion 3c. After that, the assembly conveyance mechanism 50 is raised. Thus, the swash plate 3b is separated from the shaft support portion 41, and the shaft assembly S, which has the pistons 2 suspended by the swash plate 3b, is carried out of the assembly device A1. When the shaft portion 3a is inserted into the insertion hole 51a, the posture of the shaft 3 is corrected to eliminate the angle θ1 of inclination. In consequence, the center axis of the shaft 3 extends completely vertically. Thus, the state of supporting the shaft 3 is changed over from a previous swash plate 3b base to a shaft portion 3a base. On the other hand, each of the pistons 2 is rockable with respect to the swash plate 3b due to the spherical fitting between corresponding ones of the shoes 4 and the spherical seats, and is bound from the radially outer side thereof by a corresponding one of the piston guides 53, whose inner peripheral surface is perpendicular to the center axis thereof. Therefore, the central axis of each of the pistons 2 is held substantially vertical.

After that, the assembly conveyance mechanism 50 moves horizontally with the assembly support portion 52 supporting the shaft assembly S, thereby conveying the shaft assembly S to the second process following the first process. In this second process, a main part of the swash plate-type compressor is assembled by an assembly device A2 shown in FIG. 7.

The assembly device A2 of this embodiment of the present invention includes a cylinder block support portion 60 and a piston posture correction mechanism 70 as well as the aforementioned assembly conveyance mechanism 50.

The cylinder block support portion 60 is fixed to the frame 44. In this embodiment of the present invention, the cylinder block support portion 60 includes a pedestal 61 and a base board 62. The cylinder block 1 is supported on the base board 62 in a positioned state, with a front-side end surface of the cylinder block 1 facing upward. A guide hole 62a, which is located at the same position as and has the same diameter as each of the cylinder bores 1a of the cylinder block 1, is formed through the base board 62.

Figure 8:
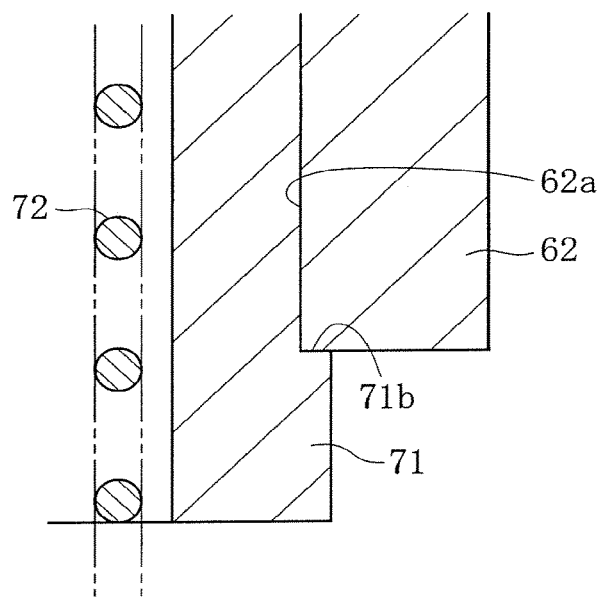
FIG. 8 is a sectional view showing the P region of FIG. 7 on an enlarged scale.

The piston posture correction mechanism 70 includes a cylindrical correction member 71, and a spring 72 as an elastic member for applying an upward elastic force to the correction member 71. The correction member 71 is slidably inserted into a continuous hole, which is formed of each of the cylinder bores 1a and the guide hole 62a. The spring 72 is interposed in a compressed state between a step portion 71a formed on an inner peripheral surface of the correction member 71 and, for example, the pedestal 61 on a stationary side. As shown in FIG. 8 on an enlarged scale, a stopper portion 71b is formed on an outer peripheral surface of the correction member 71. This stopper portion 71b is axially engaged with an end surface of the base board 62 due to an elastic force of the spring 72. In this state, a tip surface 71c (correction surface) of the correction member 71 protrudes above the front-side end surface of the cylinder bore 1a by a small width (δ).

As soon as the cylinder block 1 is supplied onto the base board 62, positioned, and supported, the assembly conveyance mechanism 50 supporting the shaft assembly S is lowered. As the shaft assembly S is lowered, the rear-side end surface 2b1 of each of the pistons 2 suspended by the swash plate 3b first comes into surface contact with the correction surface 71a of the correction member 71. Furthermore, each of the pistons 2 is inserted into a corresponding one of the cylinder bores 1a while causing the correction member 70 to retreat against the elastic force of the spring 72.

Incidentally, while the shaft assembly S is conveyed by the assembly conveyance mechanism 50, each of the pistons 2 is rockable due to the spherical fitting between corresponding ones of the shoes 4 and the spherical seats, and is simply held in position due mainly to a frictional force acting between each of the shoes 4 and the end surface of the swash plate 3b. Accordingly, each of the pistons 2 may be slightly inclined with respect to the vertical axis or displaced due to vibrations transmitted from the outside or the like. As a measure against this phenomenon, according to the present invention, the correction member 71 is provided as described above, and the rear-side end surface 2b1 of each of the pistons 2 is brought into surface contact with the correction surface 71a before the piston 2 is inserted into the corresponding one of the cylinder bores 1a. Therefore, even in the case where the piston 2 is inclined, the posture thereof can be corrected into a vertical posture. In general, the tapered surface 1b (see FIG. 1) is formed along the front-side opening portion of the cylinder bore 1*a*, so the displacement or inclined posture of the piston 2 is also corrected by a guiding operation of the tapered surface 1*b* at the time of insertion. Accordingly, each of the pistons 2 can be smoothly inserted into a corresponding one of the cylinder bores 1*a* without scraping that cylinder bore 1*a*.

After the pistons 2 are thus inserted into the cylinder block 1 to a prescribed position thereof, required parts such as the bearings 9*a* to 9*c* are mounted, and further, the front housing 6 and the rear housing 8 are installed at both the ends of the cylinder block 1, respectively. Thus, the assembly of the swash plate-type compressor shown in FIG. 1 is completed.

If the cylinder block 1 and the rear housing 8 are combined in advance into an assembly and disposed on the base board 62 to mount the shaft assembly S according to the same procedure as described above, the process of installing the rear housing 8 can be omitted. As a result, a further improvement in productivity can be achieved.

As described above, according to the present invention, both the shaft assembly S and the main part of the swash plate-type compressor are assembled in the vertical axis posture by the assembly device A1 and the assembly device A2, respectively, so there is no need to support each of the pistons 2 from both the axial sides thereof as in conventional cases where the shaft assembly S and the main part of the swash plate-type compressor are assembled in a horizontal axis posture. Accordingly, the shaft assembly S and the main part of the swash plate-type compressor can be assembled regardless of whether or not the center hole 2*c*2 is formed in each of both the end surfaces 2*b*1 and 2*c*1 of each of the pistons 2.

Although the single-headed pistons 2 are exemplified in the foregoing description, the present invention can be applied in the same manner even to cases where double-headed pistons are employed.

The invention claimed is:

1. A device for assembling a swash plate-type fluid machine for incorporating a shaft assembly, which has a plurality of pistons each installed on a swash plate via a pair of shoes matching with both end surfaces of the swash plate, respectively, into a cylinder block, the device comprising:
    an assembly support portion for supporting the shaft assembly in a vertical axis posture with the respective pistons suspended by the swash plate;
    a cylinder block support portion for supporting the cylinder block, wherein the assembly support portion and the cylinder block support portion approach each other to insert the pistons of the shaft assembly into a corresponding one of cylinder bores of the cylinder block; and
    a correction surface that is movable in a reciprocating manner into and out of an opening portion of the corresponding one of the cylinder bores of the cylinder block and can be positioned to protrude above an end surface of the opening portion, wherein the correction surface is brought into surface contact with an end surface of each of the pistons of the shaft assembly, which is supported by the assembly support portion, to correct a posture of each respective piston.

2. A device for assembling a swash plate-type fluid machine according to claim 1, wherein the pistons inserted into the corresponding one of the cylinder bores are guided by a tapered surface provided along an opening portion of the cylinder bore.

\* \* \* \* \*